3,025,270
LINEAR POLYESTER-HYDRAZIDES
Hobson D. De Witt, New Wilmington, Pa., assignor to The Chemstrand Corporation, Decatur, Ala., a corporation of Delaware
No Drawing. Filed Sept. 10, 1958, Ser. No. 760,082
7 Claims. (Cl. 260—78)

This invention relates to the production of synthetic polymeric products and in particular to the production of linear polyester-hydrazides suitable for the formation of filaments, films, and plastic materials.

It has previously been proposed to prepare polymers in which dihydrazides of dicarboxylic acids are used as a reactant. For example, in U.S. Patent No. 2,512,667 the production of polymers from dihydrazides of dicarboxylic acids in the presence of hydrazine is described. These polymers contain triazole nuclei repeated along the polymer chain and obviously are quite unlike the new polymer described hereinbelow.

It is an object of this invention to provide linear polymers derived from dicarboxylic acids and monohydroxy hydrazides which can be formed into fibers, filaments, films, and other useful materials. It is another object of this invention to provide a method for the production of a new and useful polymer derived from dicarboxylic acids and monohydroxy hydrazides, and capable of being oriented into fibers and filaments for particular use in the textile industry. It is still another object of this invention to provide a composition of matter composed of dicarboxylic acids and monohydroxy hydrazides, the reaction product thereof having value for the production of fibers and filaments in the textile industry. Other objects and advantages of the invention will be apparent from the following detailed description.

The objects of this invention are attained by bringing together under reaction conditions the requisite amounts of a dicarboxylic acid and an omega-monohydroxy hydrazide and continuing the resulting reaction until a high molecular weight fiber-forming material is obtained. The reaction is normally carried out at an elevated temperature, preferably in an inert atmosphere, and at atmospheric pressure, although the reaction may be carried out at pressures above or below atmospheric pressure.

The dicarboxylic acids include any dicarboxylic acid containing the two acid groups as the sole reactive groups. The dicarboxylic acids are of the general formula

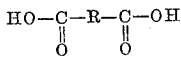

where R is a divalent organic radical free from reactive substituents, preferably a hydrocarbon. It is preferred that R is a polymethylene radical containing 2 to 8 or more methylene groups. Specific examples of such dicarboxylic acids where R is a polymethylene radical include glutaric acid, adipic acid, suberic acid, azelaic acid, sebacic, and higher acids of this series. It is to be understood that the invention is not, however, confined to the use of dicarboxylic acids in which the carboxyl groups are linked by unsubstituted polymethylene chains. These groups may be linked as well by polymethylene chains containing substituents that are inert to the reactants used. Examples of dicarboxylic acids containing such chains are 1,3-dimethyl-glutaric acid, 2-methyl-adipic acid, 1,1- and 2,2-dimethyl-adipic acid, and 3-methoxy-adipic acid. Furthermore, the carboxyl groups may be linked together by arylene, alkarylene, or cycloalkylene groups which may also contain inert substituents if desired, for example, terephthalic acid, isophthalic, diphenic acid, phenylene-1,4-diacetic acid, para-carboxyl-phenyl-acetic acid, 4-carboxy-cyclohexyl-acetic acid, and other similar dicarboxylic acids. Furthermore, dicarboxylic acids containing hetero atoms which do not interfere substantially with the reaction are not precluded from the scope of the invention.

The omega-monohydroxy hydrazides employed in the preparation of the linear polyester-hydrazides are of the general formula

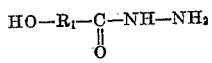

where $R_1$ is a divalent radical free from reactive substituents, preferably a hydrocarbon. Specific examples of such hydrazides where $R_1$ is a poly-methylene radical include 3-hydroxy-propionic hydrazide, 3-hydroxy-butyric-hydrazide, 4-hydroxy-butyric hydrazide, 5-hydroxy-valeric hydrazide, 3-methyl-5-hydroxy-valeric hydrazide, 6-hydroxy-caproic hydrazide, 7-hydroxy-enanthic hydrazide, and 8-hydroxy-caprylic hydrazide. Specific examples where $R_1$ is an arylene, alkarylene, or cycloalkylene radical include para-hydroxy-benzoic hydrazide, para-(2-hydroxyethyl)-benzoic hydrazide, para-(3-hydroxypropyl)-benzoic hydrazide, para-(4-hydroxybutyl)-benzoic hydrazide, 3-(3'-hydroxypropyl)-cyclopentanecarboxylic hydrazide, and 4-(3'-hydroxypropyl)-cyclohexanecarboxylic hydrazide.

The amounts of the reactants employed vary without departing from the invention. It is generally more advantageous to react the dicarboxylic acid and the omega-monohydroxy hydrazide in substantially equimolar quantities. While the molecular ratio of the reactants has no pronounced effect on the polymer obtained, a marked molecular excess creates a recovery problem due to the presence of the unreacted intermediate and is not economical.

In producing the polymer of the present invention, the polymerization may be conducted in the presence of catalysts as well as in the presence of molecular weight regulators. Other additives that modify the polymer such as delustrants, plasticizers, pigments, colorants, and oxidation inhibitors may also be incorporated in the polymer if desired.

The new polymer may be prepared by mass polymerization, solution polymerization, or aqueous suspension polymerization in a conventional manner. The polymerization may be conducted in batch lots, by continuous methods, or by semi-continuous methods. In general, the process employed to prepare the linear polyester hydrazides involves a polymerization reaction wich is easily controlled and requires no special equipment.

While the invention includes the production of polymers of relatively low molecular weight that may be useful in the manufacture of coating compositions, lacquers, and the like, it is primarily concerned with the production of polymers which have film- and filament-forming properties. Filaments may be produced by melt spinning, i.e., by extruding a melt of the polymer through suitable orifices in a spinneret and into a cooling atmosphere. The streams of polymer that emerge vertically downwardly from the spinneret solidify in the air to form filaments. Filaments may be also produced by conventional wet spinning where a solution of the polymer is extruded through orifices in a spinneret and into a liquid coagulating bath or by conventional dry spinning where a solution of the polymer is extruded through orifices in a spinneret and into a medium containing an evaporative atmosphere. If the polymer has a sufficiently high molecular weight, the filaments so formed may be drawn at a comparatively low temperature to filaments having good tenacity and elasticity.

In order to more clearly understand the process of the present invention, the following examples are given which are intended to be illustrative and not limitative.

Example I

A reaction vessel was charged with 1.22 grams of 4-hydroxy-butyric hydrazide, 1.46 grams of adipic acid and 10 milligrams of zinc acetate as a catalyst. This mixture was melted together by the application of heat. The resulting melt was held at 200° C. for 90 minutes to complete the polycondensation reaction. The polymer so formed yields filaments that can be cold drawn.

Example II

Into a reaction vessel 1.22 grams of 4-hydroxy-butyric hydrazide, 1.46 grams of adipic acid and 10 milligrams of zinc acetate as a catalyst were introduced. The vessel was filled with nitrogen and heated for 20–30 minutes at 180° C. and for a further 60 minutes at 287° C. to complete the polycondensation reaction. The polymer so formed yields filaments that can be cold drawn.

When the above examples are repeated with other defined dicarboxylic acids and monohydroxy-hydrazides, similar results are obtained. For example, when 3-hydroxy-butyric hydrazide, 5-hydroxy-valeric hydrazide, and the like are employed, polymers capable of being formed into fibers having useful textile properties are obtained. Likewise, useful polymers are obtained when glutaric acid, suberic acid, azelaic acid, and other dicarboxylic acids of the type are used.

It is not intended that the invention be limited solely to the details of the embodiments set forth above as it will be recognized by the man skilled in the art that numerous and obvious modifications conforming to the spirit of the invention may be made and it is intended that the invention be limited solely by the scope of the appended claims.

What is claimed is:

1. A method of producing a polymer comprising heating together at an elevated temperature a mixture of a dicarboxylic acid of the general formula

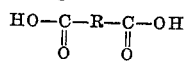

where R is a divalent organic radical and an omega-hydroxy-hydrazide of the general formula

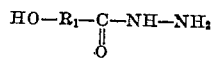

where $R_1$ is a divalent organic radical free from reactive substituents, said acid and said hydrazide being employed in about equimolar amounts.

2. A method as defined in claim 5 where R is a cycloalkylene radical.

3. A method as defined in claim 5 where R is an arylene radical.

4. A method as defined in claim 5 where $R_1$ is an arylene radical.

5. A method of producing a polymer comprising heating together at an elevated temperature a mixture of a dicarboxylic acid of the general formula

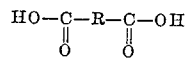

and an omega-hydroxy-hydrazide of the general formula:

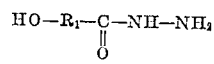

where R and $R_1$ are polymethylene radicals containing 2 to about 8 methylene groups until a high molecular weight material is obtained, said acid and said hydrazide being employed in about equimolar amounts.

6. A method of producing a polymer comprising heating together a mixture of adipic acid and 4-hydroxy-butyric-hydrazide in the presence of a catalytic amount of zinc acetate until a high molecular weight material is obtained, said acid and said hydrazide being employed in about equimolar amounts.

7. The polymer product produced by the method defined in claim 1.

References Cited in the file of this patent

UNITED STATES PATENTS

| | | |
|---|---|---|
| 2,463,977 | Kropa | Mar. 8, 1949 |
| 2,512,632 | Fisher | June 27, 1950 |

FOREIGN PATENTS

| | | |
|---|---|---|
| 1,141,897 | France | Nov. 25, 1957 |

OTHER REFERENCES

Iwakura: "Chemical Abstracts," page 5103, vol. 44 (1950).